UNITED STATES PATENT OFFICE.

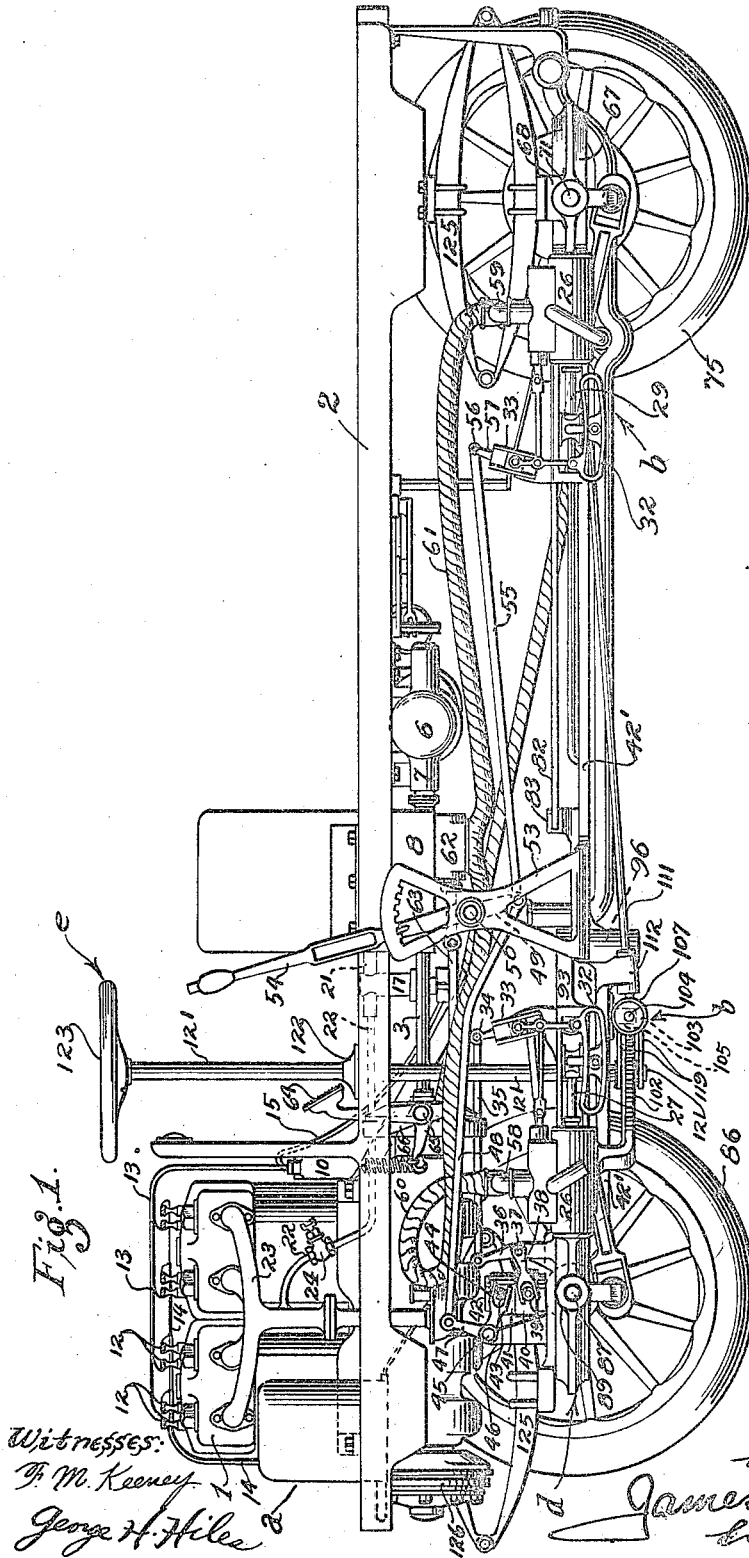

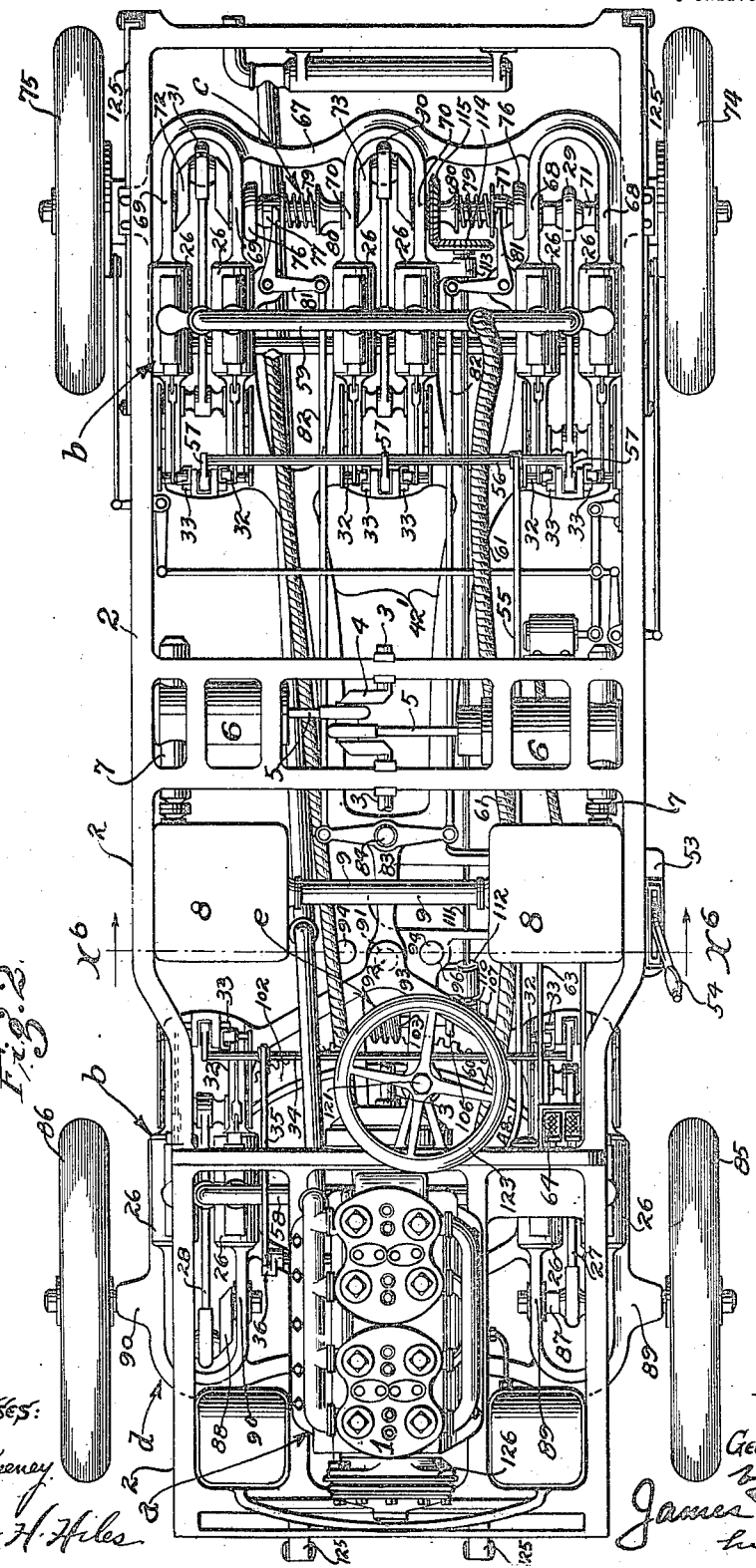

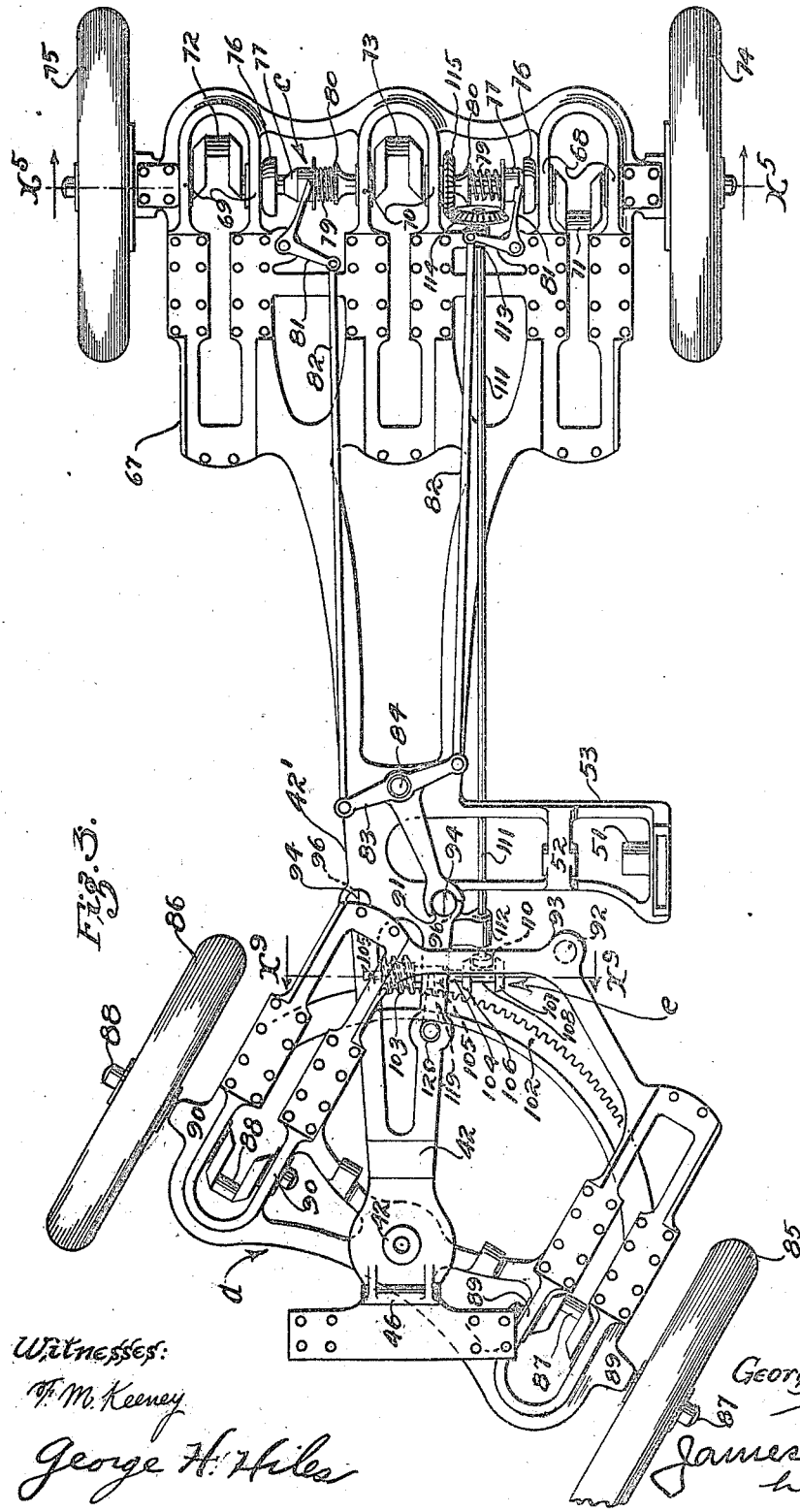

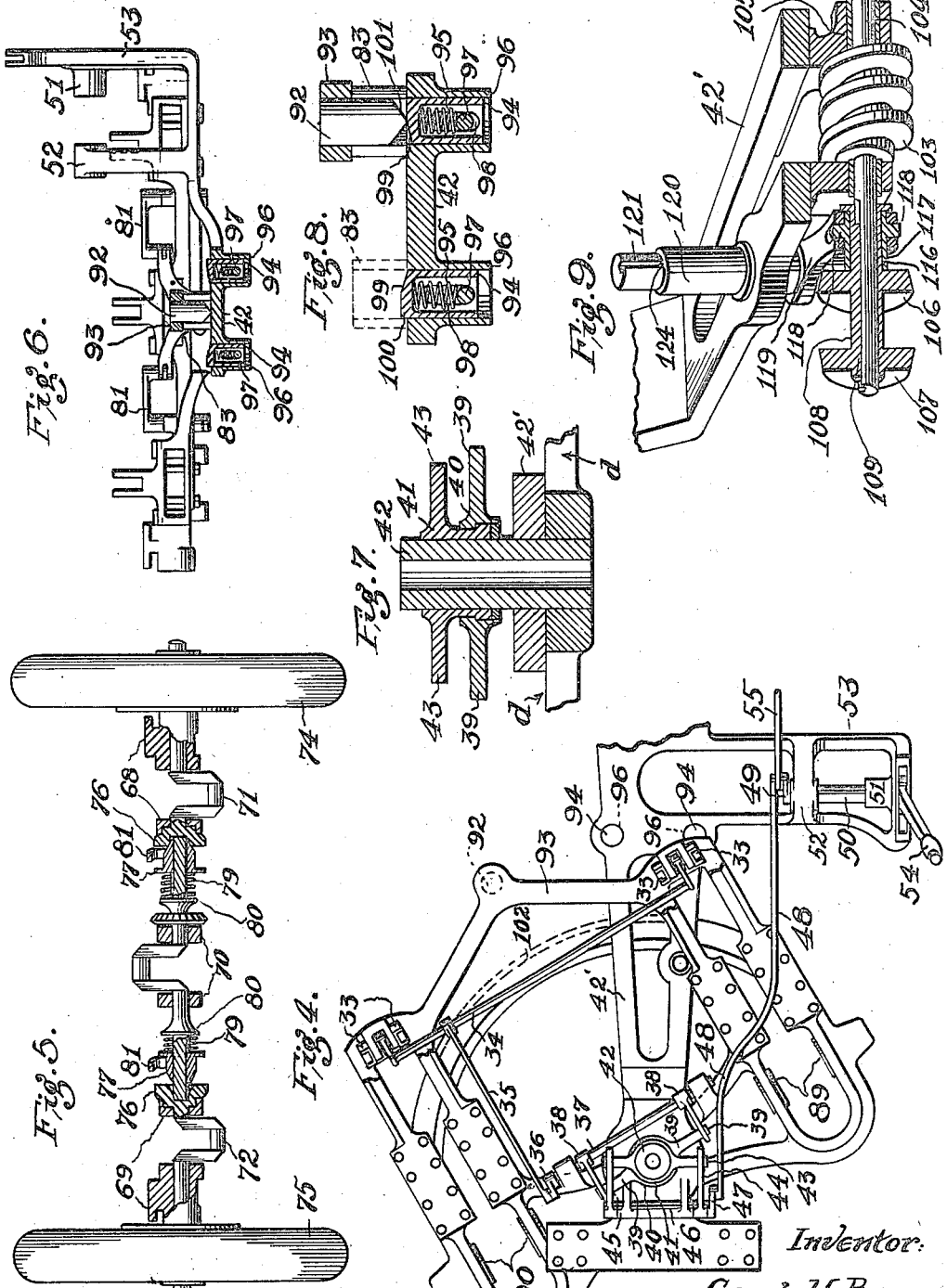

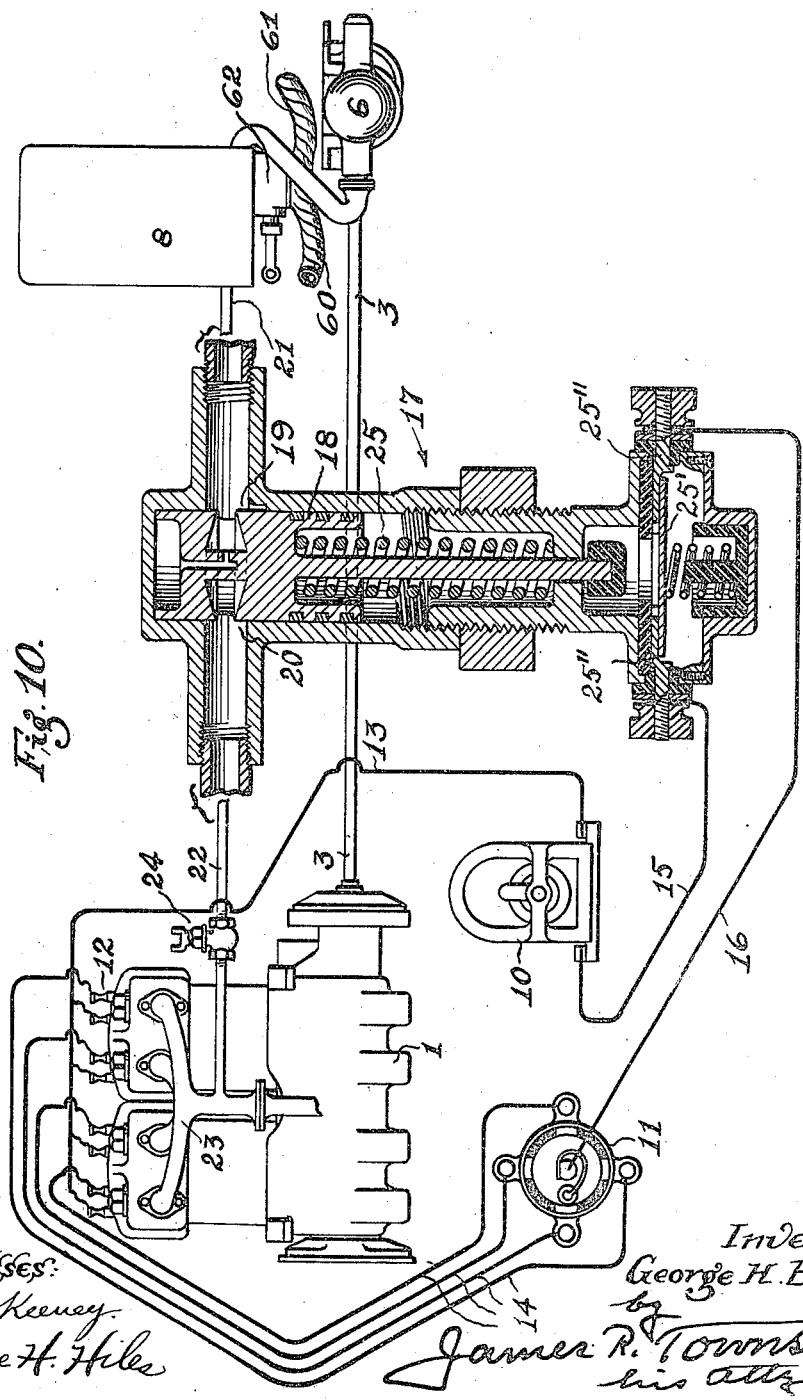

GEORGE H. BARNES, OF EAST HIGHLANDS, CALIFORNIA.

DIRIGIBLE VEHICLE.

1,184,408.  Specification of Letters Patent.  Patented May 23, 1916.

Application filed February 16, 1915. Serial No. 8,650.

*To all whom it may concern:*

Be it known that I, GEORGE H. BARNES, a citizen of the United States, residing at East Highlands, in the county of San Bernardino and State of California, have invented new and useful Improvements in Dirigible Vehicles, of which the following is a specification.

This invention relates to an improved power driven vehicle and more particularly to the driving and control mechanism whereby the power is transmitted to both propel and steer the vehicle.

It is an object of the invention to obtain greater flexiblity of control, to accomplish the steering action by the power plant, and hence with greater ease to the operator and to apply the propelling power with maximum effect to all of the vehicle wheels so that all of said wheels are effectual in maintaining traction.

A further object is to simultaneously and continuously drive two co-axial traction wheels with equal power when the vehicle is going straight and to shift a portion of the propelling power from one to the other of such wheels as the vehicle is turned from a straight course so as to apply the power in greater measure to that one of the traction wheels requiring the greater power in consequence of the difference in speeds between said wheels, that is to say, I regard this invention as pioneer in that I apply three motors for the driving of two co-axial traction wheels, each of said wheels being at all times driven by its particular motor and the power of the third motor being applied selectively to the driving of both wheels on the straight course and to the driving of a selected one of said traction wheels when the vehicle turns in one direction and to the driving of the other of said traction wheels when the vehicle turns in the other direction.

A further object is to generate the propelling power under a constant load upon the generator and to apply the power as needed through separate means to accomplish propulsion and dirigibility of the vehicle.

A further object is to dispense with transmission gear wheels and the usual change speed mechanism heretofore in use in automobile construction.

An especial object is to facilitate the steering of the vehicle and thus prevent shocks and disturbance to the operator from inequalities and obstructions in the course over which the vehicle is driven.

Another object of the invention is to avoid the necessity of a number of variable connections between the propelling means and the traction wheels when the motive power is carried upon a spring-supported frame.

Another object is to generate and store the motive power and applying said power with maximum effect for traction purposes in sufficient quantities as needed, so that all of the stored-up power is available and may be used in propelling the vehicle up a hill or inclined course without overloading the power generator, thereby obviating the various troubles due to overheating, failure of the fuel supply and the like, often encountered with in the running of automobiles.

Another object is to generate and store power for tractive purposes, that the power may be maintained at maximum at nominal expense for fuel and lubricating oils.

Another object is the provision of differential mechanism devoid of gear wheels.

Another object is to simplify the controlling operations of an automobile so that besides the usual brakes there are only the throttle lever and steering element requiring the operator's immediate attention to control the speed and course of the automobile.

Another object is to effect the foregoing without the use of steam and consequently without it being necessary to carry and maintain a supply of water.

While the embodiment of the invention as herein provided for is well adapted to serve the objects of the invention it is to be understood that the invention is not limited to the precise construction exhibited in the drawings filed herewith; but that variations, alterations and modifications of minor import may be made without departing from or sacrificing any of the advantages of the invention.

Other objects and advantages may appear from the subjoined detail description.

The accompanying drawings illustrate the invention.

Figure 1 is a side elevation of a chassis built in accordance with this invention, the two near wheels being omitted for clearness of illustration. Fig. 2 is a plan view of Fig.

1 with all the wheels intact, the ignition system and air-controlled switch being omitted, and the crank shaft of the explosive engine being partly broken away for clearness of illustration. Fig. 3 is a plan view of some of the parts shown in the preceding views illustrating the differential mechanism and the driving connections between the fifth wheel and rear axle, the front wheels being shifted into a position for effecting a right hand turn of the vehicle and one of the front wheels being partly broken away to contract the view. Fig. 4 is a fragmentary plan view of the fore part of the chassis shown in the preceding views to illustrate the valve-gear-shifting connections between the reach and fifth wheel. Fig. 5 is an elevation mainly in section on line indicated by $x^5$—$x^5$, Fig. 3, illustrating the three-part rear axle. Fig. 6 is an enlarged fragmentary elevation partly in section on irregular line indicated by $x^6$—$x^6$, Fig. 2. Fig. 7 is an enlarged sectional detail of the king pin and the sleeves of the valve-gear-shifting connections. Fig. 8 is an enlarged sectional detail of some of the parts in Fig. 6, dotted lines indicating the operating parts in a latched position and solid lines indicating said parts in a latch-retracted position. Fig. 9 is an enlarged fragmentary perspective view mainly in section on line indicated by $x^9$—$x^9$, Fig. 3. Fig. 10 is a view, partly diagrammatic, of the ignition system, the pressure-controlled switch, explosive engine and one of the air tanks, the pressure-controlled switch being shown in mid-section on a much larger scale than the other parts for clearness of illustration.

Arrows on the section lines in some of the views indicate the direction of sight.

The dirigible vehicle shown in the drawings is constructed with an initial fluid-compressing power plant $a$ of any suitable character, a fluid-operated power-distributing plant $b$ of suitable design, novel differential mechanism $c$, a fifth wheel $d$ having novel driving connections with the differential mechanism, and manually-operated means $e$ to control said driving connections.

The power plant $a$ in the instance shown comprises a four-cylinder explosive engine comprises a suitable frame 2 of the chassis 1 mounted on a suitable frame 2 of the chassis, said engine being provided with a crank shaft 3 extending lengthwise of said frame to near the middle thereof and connected by a crank 4 to the pistons 5 of air compressors 6 which discharge compressed air through pipes 7 into compressed air tanks 8 that together constitute an accumulator, said air compressors and tanks being mounted on the frame 2.

The air tanks 8 are connected across from one to the other by a pressure-equalizing pipe 9 so that the pressures in both tanks will be the same as one another.

To control the range of pressure in the air tanks 8 so that said pressure will not rise beyond a desired maximum and will not fall below a desired minimum, the following provision is made: An ignition system of the usual character may be provided and in the instance shown, see Figs. 1 and 10, said system includes a source of electric current as, for instance, a magneto 10, and also includes a timer 11, spark plugs 12, wires 13 connecting the magneto to the spark plugs and wires 14 connecting the spark plugs to the timer. The magneto 10 and timer 11 are connected by wires 15, 16 to a pressure-controlled switch 17 of which the valve plug 18 opens and closes the inlet and outlet ports 19, 20 respectively connected by a pipe 21 to one of the tanks 8 and by a pipe 22 and manifold 23 to the cylinders of the combustion engine. The pipe 22 is provided with a valve 24. The switch spring 25 is not sufficiently strong to overbalance the predetermined maximum pressure, but is sufficiently strong to overbalance the predetermined minimum pressure, so that when the pressure rises to the maximum of, for instance, three hundred pounds per square inch, the valve plug will be operated by the compressed air to move a spring actuated bridging contact plate 25' away from terminal contacts 25" to throw out the switch and close the ports 19, 20 and so that when the pressure falls to the minimum of, for instance, two hundred and fifty pounds per square inch, the valve plug will be operated by the spring to open the ports 19, 20, and close the switch.

From the foregoing it is seen that when the valve plug 18 is operated to open the ports 19, 20 compressed air will flow into the explosive engine 1 to start said engine, and that when the valve plug operates to open the switch and close the ports ignition cannot take place and the engine will stop and compressed air cannot flow to start said engine until the ports are again opened.

More detailed description of the pressure-controlled switch 17 is unnecessary as said switches are well known.

The fluid-operated power-distributing plant $b$ comprises two sets of air engines, a front set of two engines and a rear set of three engines, each air engine in the instance shown in the drawings having a pair of cylinders 26 between which cylinders for the various air engines extend the engine pitmen 27, 28 of the front engines and pitmen 29, 30, 31 of the rear engines respectively. Each of said air engines is provided with a suitable valve gear 32 having slotted links 33.

The slotted links 33 of the front engines are connected to one another by a transverse shifting rod 34, which pivotally connects said links to a shifting rod 35 that is pivoted to a crank arm 36 turning with a crank axle 37 which is provided with other crank arms 38 having their ends slotted to engage studs 39 of a sleeve 40.

The sleeve 40 is rotatably mounted on a sleeve 41 which is vertically shiftable on a king-pin 42 fixed in the fifth wheel $d$ and extending through the reach 42' to pivotally connect the fifth wheel and reach. Thus the sleeve 40 is rotatable and also vertically shiftable relative to said king-pin.

The sleeve 41 is provided with studs 43 similar to the studs 39 to engage the slotted ends of crank arms 44 of a crank shaft 45 journaled at 46 on the reach 42', said crank shaft having a crank arm 47 pivoted to an operating rod 48 which is pivoted to a crank arm 49 of a crank shaft 50 journaled at 51, 52 to a bracket 53 extending laterally from the reach.

The crank shaft 50 is provided at one end with a valve-gear-shifting lever 54 and said crank arm 49 is pivoted to an operating rod 55 extending rearward to a transversely-extending rod 56 which carries crank arms 57 extending from the slotted links 33 of the rear air engines.

From the foregoing it is clear that shifting of the valve-gear lever 54 will simultaneously operate all of the slotted links 33 to change the angle thereof in a manner well understood by those versed in valve-gear construction and operation.

The cylinders 26 are supplied with compressed air through front and rear manifolds 58, 59 which are connected by flexible tubes 60, 61 to a throttle valve 62 in turn connected to and receiving compressed air from one of the air tanks 8.

The throttle valve 62 is connected by a link 63 to the lower end of a foot lever 64 pivoted at 65 to an arm 66 which is fastened to the frame 2.

The cylinders 26 of the front engines together with their valve-gears 32 are mounted on the fifth wheel $d$, and the cylinders 26 of the rear engines together with their valve-gears 32 are mounted on the rearwardly expanded end portion 67 of the reach.

The novel differential mechanism $c$ will now be described. The reach portion 67 is provided with pairs of axle boxes, two side pairs 68, 69 and an intermediate pair 70, and said boxes serve to journal a sectional or three-piece rear crank axle formed of two end sections 71, 72 journaled in the side boxes 68, 69 respectively and an intermediate section 73 journaled in the boxes 70. The axle sections 71, 72, 73 connect with the pitmen 29, 30, 31, respectively. The end sections 71, 72 are provided with rear wheels 74, 75 respectively. The rear crank axle is provided between its adjacent sections 71, 72 and 72, 73 with suitable clutches and in the instance shown in the drawings said clutches comprise cone socket members 76 turning with the end sections 71, 72 and cone stud members 77 shiftable endwise on the intermediate section 73 and held against rotation relative to said intermediate section by splines 78. The clutches are thrown into clutching position by springs 79 inserted between the stud members 77 and shoulders 80 on the intermediate axle section 73 and said clutches are thrown out of clutching position by mechanism now to be described. Said springs and mechanism constitute selective means to selectively connect the intermediate and outer sections so that when the vehicle is moving directly, both outer sections will be connected to the intermediate section; and when the front axle is turned in one direction the outer section on one side will be disconnected and the other or companion section remain active, and vice versa.

The clutch stud members 77 are engaged by one arm of bell crank levers 81 which have their other arm pivoted to connecting rods 82 that are pivoted to a rocker or double bell crank lever 83 pivotally mounted at 84 on the reach 27, so that as said double bell crank lever is shifted from side to side the clutches will be alternatively thrown out.

Provision is made for automatically operating the double bell crank lever 83 by turning of the front wheels 85, 86 to one side or the other, said front wheels being provided with crank axles 87, 88 journaled at 89, 90 in the fifth wheel and connected to the pitmen 11, 12 respectively; and for this purpose the front end of the double bell-crank lever is provided with an open-sided socket 91 adapted to be engaged by a latch-releasing pin 92, projecting downward from the rear brace member 93 of the fifth wheel, when the front wheels 85, 86 are straight with the rear wheels 74 and 75 or are just slightly turned to one side or the other.

From the foregoing it is clear that turning of the fifth wheel $d$ to guide the front wheels 85, 86 toward one side will throw out the clutch on that side and that turning of the fifth wheel toward the other side will throw out the clutch on said other side. When the fifth wheel is turned to such a degree as to move the pin 92 out of engagement with the socket 91, the double bell-crank lever will be held in either of its extreme positions by one or the other of latch-pins 94 normally pressed upward by springs 95 in sockets 96 located in the reach 42', said latch-springs being prevented from turning by pins 97 fastened at their ends in the sockets and passing through slots 98 in the latch-pins.

The latch-pins 94 are provided with beveled ends 99 slanting downward toward their adjacent sides so that said latch-pins can be tripped by the socketed end of the double bell-crank lever, the unbeveled side of the pin forming a shoulder 100 to engage and hold the double bell crank lever as in dotted lines, Fig. 8.

The latch-releasing pin 92 is provided with a beveled end 101 so as to readily slide over the shoulder 100 to depress either of the latch-pins 94 as clearly shown in Fig. 8. Thus the fifth wheel $d$ when turned will move the double bell-crank lever to either of the latched positions and can be turned to a greater degree without further moving the double bell-crank lever.

The novel driving connections between the fifth wheel $d$ and differential mechanism $c$ will now be described. The fifth wheel $d$ is provided with a segmental gear wheel 102 engaging and turned by a worm wheel 103 on a transverse worm shaft 104 journaled at 105 on the under side of the reach 42', said worm shaft projecting beyond one side of the reach and being provided on the projecting end with a pair of spaced-apart friction disks 106, 107 moving with a sleeve 108, which is shiftably mounted on said worm shaft and is held against turning relative to said worm shaft by a spline 109. Either of the friction disks 106, 107 is adapted to be shifted into engagement with the periphery of a friction wheel 110 mounted on a longitudinally extending shaft 111 which is journaled at 112 to the fore part of the reach 42' and which is journaled at 113 to the expanded end portion 67 of the reach. The shaft 111 is provided at its rear end with a bevel gear wheel 114 meshing with a bevel gear wheel 115 mounted on and turning with the intermediate axle section 73.

From the foregoing it is clear that turning of the axle section 73 will cause deflection of the front wheels 85, 86 to one side or the other according as the disks 106 or 107 engages the friction wheel 110. The manually-operated means $e$ for controlling said driving connections will now be described. The sleeve 108 is provided near one end with an annular groove 116 loosely engaged by a collar 117 having studs 118 which are engaged by slotted arms 119 mounted on and turning with a sleeve 120 shiftably mounted on a steering spindle or post 121 and rotatably mounted in the reach post 42', said steering spindle being rotatably mounted by a thimble 122 on the frame 2 and provided at its upper end with a hand wheel 123, there being a spline 124 to prevent relative rotation between the spindle and sleeve.

The foregoing description makes clear that turning of the hand wheel 122 to the right or left will shift the disk 106 or 107 against the friction wheel 110 to steer the chassis to the right or left, and that relative movement between the frame 2 and arms 119 can take place without causing the hand wheel 123 to shift relative to the frame and the driver of the vehicle. The frame 2 is resiliently supported on the reach 42' by springs 125.

In practical operation assuming that all the parts are stationary and no air pressure in the tanks 8, the operator will start the explosive engine 1 by suitable means as, for instance, by putting into commission a so-termed self-starter 126 which may be of any desired construction and which need not be shown in detail herein as the construction and operation of self-starters is well understood and do not enter into this invention. The explosive engine 1 thus started compresses air into the tanks 8 and the vehicle is then ready to be driven. Then the operator will depress the foot lever 64 to open the throttle valve 62 and also will move the valve-gear-shifting lever 54 to admit compressed air into the cylinders 26 of the air engine and thereby drive the wheels 74, 75, 85, 86 either forward or backward in a manner well understood by those versed in the construction and operation of air engines. When the fifth wheel $d$ is in alinement with the reach 42' as in Figs. 1 and 2 all sections 71, 72, 73 of the rear axle will be driven together and the power from the rear air engines will be distributed equally to both rear wheels 74, 75. Now assuming that the operator wishes to turn to his right as in Fig. 3, he will turn the hand wheel 123 to his right thus moving the friction disk 106 against the friction wheel 110 so as to turn the worm wheel 103 to the right in Fig. 3, and thereby deflect the front wheels 85, 86 toward the right. This deflecting movement causes the pin 92 to shift the double bell-crank lever 83 so as to throw out the right hand clutch, thereby throwing the driving power of the rear intermediate air engine off of the axle section 72 so that all the power of said engine will be expended to aid the rear left hand engine to turn the wheel 74. When the operator wishes to again guide the vehicle in a straight course, he will turn the hand wheel 123 to his left to move the friction disk 107 against the friction wheel 110 to thereby rotate the worm 103 to the left and thereby turn the fifth wheel $d$ into alinement with the reach 42', thus causing the pin 92 to depress the latch pin 94 out of engagement with the double bell-crank lever 83 and to shift said bell-crank lever into the position shown in Fig. 2, thus allowing the clutch spring 79 of the right hand clutch to throw said clutch into commission to connect up the axle sections 72, 73. When the operator wishes to turn to his left he will turn the hand wheel 123 to the left to throw out the left hand clutch in the same manner as above described for throwing out the right hand clutch to throw all the power of the rear intermediate air engine onto the right hand axle section 72. When the air pressure in the tanks 8 rises above a predetermined maximum, for instance, three hundred pounds per square inch, or falls below a predetermined minimum, for instance, two hundred and fifty pounds per square inch, the pressure-controlled switch 17 operates to shut off or start the explosive engine 1 as hereinbefore described. When the operator desires to let the vehicle stand for any length of time he will close the valve 24 so that approximately the maximum pressure in the tanks 8 can be utilized at a later period of time to start the explosive engine 1, which starting is done by the operator merely opening the valve 24.

The explosive engine 1 may be cooled by any suitable means and is preferably air-cooled so that no water will be required in the running of the vehicle; and very satisfactory means for cooling said engine are shown, described and claimed in my co-pending application for power apparatus and method of air-cooling the same, filed February 16, 1915, Serial No. 8649, and not shown, described and claimed herein since they embody a separate invention from this present invention.

I claim:—

1. A self-propelled vehicle having an axle constructed in an intermediate and two outer sections; a clutch normally connecting the intermediate section with one of the outer sections; a clutch normally connecting the intermediate section with the other outer section; motors for the sections respectively to drive such sections independently of each other; and means for operating the clutches to disconnect either of the outer sections from the intermediate section without disconnecting the other outer section from the intermediate section so that the power of the motor of the intermediate section may be applied at one time to drive both the outer sections, and at other times to drive one outer section exclusive of the other outer section or vice versa.

2. A self-propelled vehicle having a swinging axle; traction wheels on said axle; a rotating axle constructed in intermediate and two outer sections; clutch means normally connecting the intermediate section and one of the outer sections for their simultaneous operation; clutch means for normally connecting the intermediate sections and the other outer section for their simultaneous operation; motors for the sections respectively to operate said sections independently of each other; and means connecting the front and rear axles to operate the clutch means to disconnect one of said sections from the intermediate section when the front axle is turned in one direction, and vice versa, when the front axle is turned in the other direction.

3. A self-propelled vehicle having a swinging front axle, a rotating rear axle, said rear axle having three sections, clutch means normally connecting said sections together for simultaneous operation, a motor to operate each of said axle sections, and means connecting the front and rear axles to operate the clutch means to disconnect one of said sections from another section when the front axle is turned.

4. A dirigible vehicle having a sectional rear axle consisting of three sections, traction wheels on the two outer sections, motive power units for the three sections respectively, and selective coöperative means for connecting the three sections simultaneously to drive the traction wheels, and means for selectively disconnecting one of the outer sections from the intermediate section, and vice versa.

5. In a dirigible vehicle the combination with a driving axle consisting of three sections, traction wheels on the two outer sections, and motive power units for the three sections respectively, of selective means coöperatively connecting the intermediate section to the end sections to drive the traction wheels, selectively with three motors for two wheels or with one motor for one wheel and two motors for the other wheel.

6. In a dirigible vehicle the combination with a driving axle consisting of an intermediate section and two end sections all of which have a common axis, traction wheels on the end sections, and a motive power unit for operating each section, of means for shifting the power from the intermediate section to either of said end sections.

7. In a dirigible vehicle the combination with a driving axle, consisting of an intermediate section and two outer sections having a common axis and capable of differential rotation, of motive power units to operate each section, selective contact members to cause the sections to rotate in unison, or to rotate one or the other independently of the other two and traction wheels on the end sections.

8. In a dirigible vehicle the combination with a rear driving axle consisting of three sections having a common axis, a motive power unit to operate each section, and traction wheels driven by the end sections; of means to cause the three sections to rotate in unison, and means to disengage the intermediate section from either of the end sections.

9. In a dirigible vehicle the combination with a rear driving axle consisting of three sections having a common axis, a motive power unit to operate each section, and traction wheels driven by the end sections; of clutch members carried by the sections, said clutch members being normally in contact, and means operated by turning the vehicle to disengage adjacent clutch members.

10. In a dirigible vehicle the combination with a rear driving axle consisting of three sections having a common axis, a motive power unit to operate each section, and traction wheels driven by the end section; of clutches normally connecting the sections to one another, a front axle angularly movable about a vertical axis, and means whereby the angular movement of the front axle shifts either one of said clutches out of connecting position.

11. In a dirigible vehicle the combination with a rear driving axle consisting of three sections having a common axis, a motive power unit to operate each section, and traction wheels driven by the end sections; of clutches normally connecting the sections to one another, a front axle angularly movable about a vertical axis, means whereby the angular movement of the front axle shifts either one of said clutches out of connecting position, and means operatively connected to the intermediate section to swing the front axle to steer the vehicle.

12. In a dirigible vehicle the combination with a rear driving axle consisting of three sections having a common axis, a motive power unit to operate each section, and traction wheels driven by the end sections; of clutches connecting the sections to one another, and means for alternatively disengaging said clutches.

13. In a dirigible vehicle the combination with a rear driving axle consisting of three sections having a common axis, a motive power unit to operate each section, and traction wheels driven by the end sections; of means whereby the driving power of the intermediate section may be made coöperative with the driving power of either or both of the end sections.

14. In a dirigible vehicle the combination with a rear driving axle consisting of three sections having a common axis, a motive power unit to operate each section, and traction wheels driven by the end sections; of a clutch between the intermediate section and each of the outer sections effectual to control the rotative power of the three sections, an angularly movable front axle, bell-cranks to operate the clutches, and connecting means between the bell-cranks and the front axle to throw out one of said clutches when the front axle is shifted to steer the vehicle from a straight course.

15. In a vehicle driving axle the combination with two end sections and an intermediate section having a common axis and capable of differential rotation, and a motive power unit to drive each section; of spring-actuated clutches between the sections, and means for selectively disengaging one or the other of the clutches.

16. In a vehicle driving axle the combination with two end sections and an intermediate section having a common axis and capable of differential rotation, and motive power units, one to drive each section; of clutch members coöperating with said sections to cause the simultaneous rotation thereof, and means for alternately shifting one of the clutches to an inoperative position while its companion clutch is active.

17. In a vehicle driving axle the combination with two end sections and an intermediate section having a common axis and capable of differential rotation, and a motive power unit to drive each section; of a traction wheel driven by each of the end sections, clutches effectual to cause the simultaneous rotation of the axle sections, and means for disengaging either of said clutches to retard the speed of one traction wheel and increase the speed of the opposite traction wheel.

18. A dirigible vehicle having a sectional driving axle; air engines, there being an air engine to drive each section, means for selectively coupling the sections together, an air compressor for supplying compressed air to the air engines, and a gasolene motor to drive the air compressors.

19. A dirigible vehicle comprising a rear axle of three sections having a common axis and capable of differential rotation, a motive power unit to actuate each section, a traction wheel driven by each end section, clutches effectual to cause the simultaneous rotation of the axle sections, and means for disengaging either of said clutches to retard the rotation of one traction wheel and to increase the rotation of the opposite traction wheel, said disengaging means comprising a swiveled front axle, a fifth wheel carried by the front axle, means for swinging the front axle to steer the vehicle, a reach extending between the front and rear axles, bell cranks pivoted near the rear axle to said reach and actuating said clutches, a forward rocker pivoted to the reach adjacent to the fifth wheel, connecting rods maintaining the parallelism of said rocker and bell cranks, means on the forward rocker forming a socket, and a pin on the fifth wheel engaging said socket in said rocker when the forward axle is parallel with the rear axle, said pin actuating said rocker in either direction in accordance with the front axle when turned to steer the vehicle from a straight course and through said parallel connecting rods and bell cranks disengaging one of said clutches on the rear axle.

20. In a dirigible vehicle a rear driving axle having an intermediate section and two end sections, traction wheels actuated by the end sections, clutches normally operating the three sections in unison and means for disengaging one of said clutches, said disengaging means comprising a front axle, a fifth wheel on the front axle, a pin projecting from the fifth wheel, a reach between the front axle and rear axle, means for actuating the clutches operatively mounted on the reach and engaging said pin in the straight steering position of the front axle, and means for locking the clutch-operating means when the front axle is turned to steer the vehicle from a straight course.

21. In combination, a reach, a sectional axle journaled to said reach and provided with rear traction wheels, a fifth wheel pivoted to the reach and provided with front wheels, a clutch normally held in clutching position by a spring to connect the axle sections together for simultaneous operation, a rocker pivoted to the reach and provided with an open-sided socket, means operatively connecting the rocker to the clutch, a latch-pin shiftably mounted in the reach to engage said socket to hold the clutch out of clutching position against the force of the clutch spring, and a latch-releasing pin in the fifth wheel engaging the socket when the fifth wheel is in alinement with the reach and adapted to engage the latch-pin to move said latch-pin out of latching position when the fifth wheel is swung on its pivot.

22. In combination, a reach, a sectional rear axle comprising intermediate and end sections and journaled to the reach and provided with rear wheels on its end sections, a fifth wheel pivoted to the reach and provided with front wheels, an engine connected to each of the axle sections, clutches normally in clutching position to connect the rear axle sections to one another, means operated by swinging of the fifth wheel on its pivot to throw one of said clutches out of clutching position, and means operatively connecting the fifth wheel to the intermediate axle section.

23. In combination, a reach, a sectional rear axle comprising intermediate and end sections and journaled on the reach and provided with rear wheels on its end sections, a fifth wheel pivoted to the reach and provided with front wheels, an engine connected to each of the rear axle sections, clutches normally in clutching position to connect the rear axle sections to one another, means operated by swinging of the fifth wheel on its pivot to throw one of said clutches out of clutching position, driven means operatively connected to the intermediate axle section, and manually operated means to operatively connect and disconnect the driven means and fifth wheel to and from one another.

In testimony whereof, I have hereunto set my hand at Los Angeles, California, this 9th day of February, 1915.

GEORGE H. BARNES.

In presence of—
JAMES R. TOWNSEND,
F. M. KEENEY.

Copies of this patent may be obtained for five cents each, by addressing the "Commissioner of Patents, Washington, D. C."